J. NOLAN.
Feeding Device for Nail-Machines.
No. 5,161. Reissued Nov. 26, 1872.
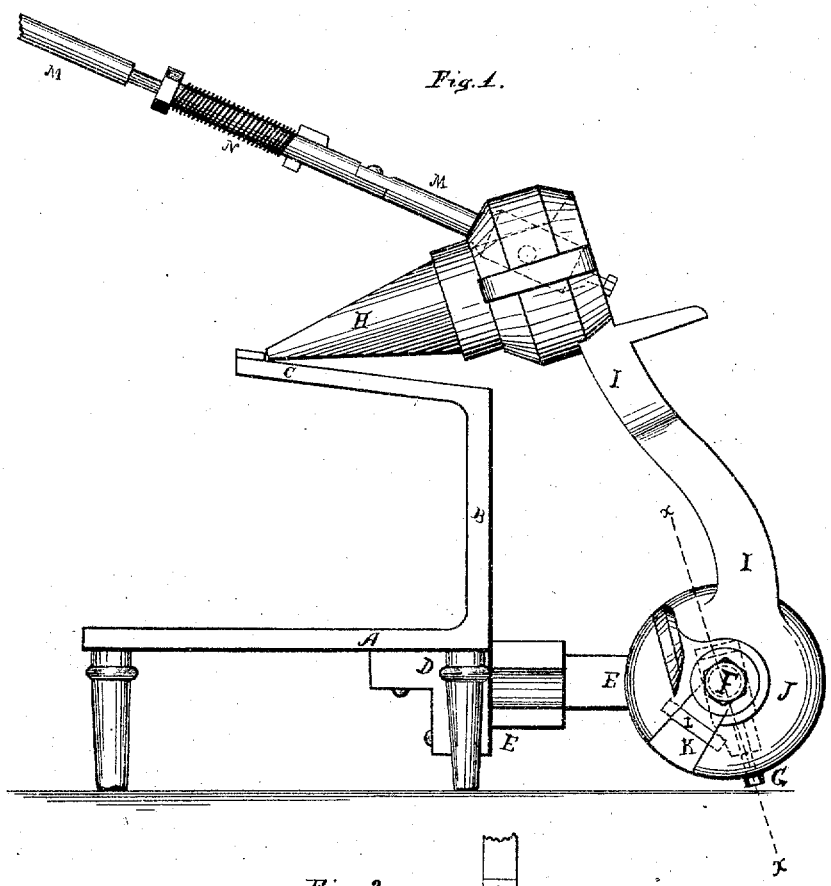
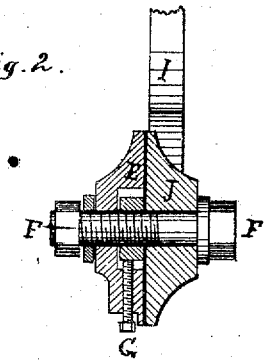
Witnesses:
P. Ellis
J. Ellis
James Nolan
Inventor:
D. P. Holloway & Co
Attys.
AM PHOTO-LITHOGRAPHIC CO. N.Y. (OSBORNES PROCESS.)

UNITED STATES PATENT OFFICE.

JAMES NOLAN, OF OXFORD, NEW JERSEY, ASSIGNOR TO HIMSELF AND E. T. HENRY, OF SAME PLACE.

IMPROVEMENT IN FEEDING DEVICES FOR NAIL-MACHINES.

Specification forming part of Letters Patent No. 101,496, dated April 5, 1870; reissue No. 5,161, dated November 26, 1872.

*To all whom it may concern:*

Be it known that I, JAMES NOLAN, of Oxford, in the county of Warren and State of New Jersey, have invented an Improvement in Feeding Apparatus for Nail-Cutting Machines, of which the following is a specification:

This invention relates to the feeding mechanism of nail-machines; and has for its object relieving the plate-holder from strain when foreign substances are introduced under the plate or the holder. In such machines as have been heretofore known the parts connected with the nail-plate operating mechanism have been liable to be broken or greatly strained by such accidents, and the resort to devices for permitting an oscillatory motion to be given to the bar upon a fixed center which has been heretofore had has modified rather than removed the difficulty. For the more perfect security of the machine it is important that when the nail-plate is raised at the point where cut by any foreign substance the other parts of the holder shall be free to be raised also, otherwise great strain, with liability to breakage, would come upon the holder, the rod, or the reciprocating mechanism. To this end my invention consists in supporting the nail-plate holder upon an automatically-adjustable joint, which, shifting with the strain which results from any change in the elevation of the point of the nail-plate, or its holder, relieves the operative parts from undue strain.

In the annexed drawing, Figure 1 is an elevation of a nail-plate-feeding machine containing my improvement. Fig. 2 is a section on the line *x x*, Fig. 1.

The same letters are employed in both figures in the indication of the same parts.

A is the bed of the machine. The frame B supports the bed-knife C. The nail-cutting mechanism is not shown, being well known. A bracket, D, is adjustably attached to the bed A by set-screws. Another bracket, E, is adjustably attached in like manner to the bracket D, both being constructed with slots which permit of the required adjustment of the brackets. Through the bracket E passes a bolt or center-pin, F, which is secured to the bracket by means of two nuts, adjustable by means of the screw G. The plate from which the nails are cut is to be carried in a revolving barrel, H, which, being in common use, need not be described. The barrel revolves in a journal-box attached to the upper end of the swinging arm I. It is apparent that, any rigid substance being interposed between the point of the barrel and the bed-knife at C, a great strain would be produced upon the mechanism supporting the nail-plate. To avoid this, in the boss J on the end of the arm I, a slot, K, is cut to receive the center-pin or bolt F in the manner shown in the drawing. The arm I turns on the center-pin, and if the barrel H be lifted at the point the arm I will be correspondingly raised on the pin F. By this means the arm I is raised on the center-pin to an extent corresponding with the thickness of the substance interposed below the barrel, and there will be little strain on the reciprocating mechanism beyond what is necessary to sustain the weight of the holder. The slot may be closed by a piece, L, let into the boss to prevent the arm from falling from the center-pin. The rod M is used in machines of this class for communicating the oscillating motion to the arm and barrel in order to bring the nail-bar under the cutter. In machines heretofore known this rod has been rigid, as well as the arm I, so that when any hard substance was interposed one or the other was liable to break. This rod is operated by a gear-wheel on the spindle of the nail-cutting machine, (not shown in the drawing because well known,) and it is attached to a pin on the journal-box in which the barrel H turns on its axis. Instead of making the rod M rigid I propose to construct it with a telescopic joint and with a spiral spring, N, or its equivalent, the tension of which is sufficient to enable it to operate the barrel and nail-plate, but which will yield to any excessive strain produced by the interposition of any solid substances in manner aforesaid. I prefer, however, the shifting center or bearing to the adjustable or yielding rod.

In no machine heretofore known has the oscillating arm which carries the nail-plate been so connected that upon the interposition of a solid substance between the nail-plate and the bed-knife the joint of the arm would be automatically dislocated so as to relieve the arm, operating-rod, and reciprocating mechanism from excessive strain.

What I claim as my invention, and desire to secure by Letters Patent as improvements in feeding apparatus for nail-cutting machines, is—

1. In combination with the plate-holder and its arm, mechanism to oscillate the same and a shiftable joint to connect the arm to the frame or other support, substantially as described.

2. As an improvement in nail-plate-feeding machines having an oscillating arm carrying a nail-plate holder, a slot formed in the end of the arm inclosing the center-pin, substantially as specified.

3. The combination of the vibrating arm I J, slotted as shown, and a spring-rod, M, formed in two parts, as set forth, with the barrel H, constructed and arranged to operate substantially as set forth.

In testimony whereof I have signed my name to the foregoing specification in the presence of two subscribing witnesses.

JAMES NOLAN.

Witnesses:
D. M. PERRY,
WARREN WARD.